US009030452B2

(12) United States Patent
Jang et al.

(10) Patent No.: US 9,030,452 B2
(45) Date of Patent: May 12, 2015

(54) LIQUID CRYSTAL DISPLAY AND DRIVING METHOD THEREOF

(71) Applicant: Samsung Display Co., Ltd., Yongin, Gyeonggi-do (KR)

(72) Inventors: Dae-Gwang Jang, Incheon (KR); Seok Ha Hong, Yongin-si (KR); Joon-Chul Goh, Hwaseong-si (KR); Byung Sun Kim, Seoul (KR); Sang Mi Kim, Yongin-si (KR); Ji Myoung Seo, Suwon-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 65 days.

(21) Appl. No.: 14/023,334

(22) Filed: Sep. 10, 2013

(65) Prior Publication Data

US 2014/0313113 A1 Oct. 23, 2014

(30) Foreign Application Priority Data

Apr. 22, 2013 (KR) ........................ 10-2013-0044347

(51) Int. Cl.
*G06F 3/038* (2013.01)
*G09G 3/36* (2006.01)

(52) U.S. Cl.
CPC ............ *G09G 3/3655* (2013.01); *G09G 3/3614* (2013.01); *G09G 2310/06* (2013.01); *G09G 2320/0204* (2013.01)

(58) Field of Classification Search
USPC ........... 345/78, 204, 208, 58, 63, 69, 92–100; 349/178, 139, 141; 257/59, 72
See application file for complete search history.

(56) References Cited

U.S. PATENT DOCUMENTS

| | | | | |
|---|---|---|---|---|
| 5,801,557 | A | 9/1998 | Dubhashi et al. | |
| 6,320,566 | B1 | 11/2001 | Go | |
| 6,342,876 | B1 * | 1/2002 | Kim | 345/87 |
| 6,963,335 | B2 * | 11/2005 | Tanaka et al. | 345/204 |
| 7,068,330 | B2 | 6/2006 | Song et al. | |
| 7,319,448 | B2 | 1/2008 | Kim et al. | |
| 7,663,583 | B2 | 2/2010 | Lee et al. | |
| 2002/0018035 | A1 * | 2/2002 | Song et al. | 345/87 |
| 2004/0263743 | A1 * | 12/2004 | Kim et al. | 349/139 |

(Continued)

FOREIGN PATENT DOCUMENTS

| | | | |
|---|---|---|---|
| KR | 10-0323243 | B1 | 1/2002 |
| KR | 10-2009-0059327 | A | 6/2009 |

(Continued)

*Primary Examiner* — Shaheda Abdin

(74) *Attorney, Agent, or Firm* — Knobbe, Martens, Olson & Bear, LLP

(57) ABSTRACT

The described technology relates to a liquid crystal display and a driving method thereof. The liquid crystal display includes a plurality of pixels arranged in a matrix form. The pixels include a liquid crystal capacitor including a pixel electrode and a common electrode as two terminals. A plurality of data lines transfer data to the plurality of pixels. The pixels include a first pixel and a second pixel, which are adjacent to each other. First and second common signals are applied to the common electrode of the first and second pixels, respectively. The second common signal is inverted to the first common signal. The first and second common signals swing between a first voltage and a second voltage. The polarity of the data voltage transferred by a data line with respect to the first common signal or the second common signal is constant during one frame.

18 Claims, 22 Drawing Sheets

(56) References Cited

U.S. PATENT DOCUMENTS

| | | | | |
|---|---|---|---|---|
| 2007/0052658 | A1* | 3/2007 | Kim | 345/100 |
| 2008/0012819 | A1 | 1/2008 | Lee et al. | |
| 2011/0032241 | A1 | 2/2011 | Jeong et al. | |
| 2011/0037750 | A1 | 2/2011 | Woo et al. | |

FOREIGN PATENT DOCUMENTS

| | | | |
|---|---|---|---|
| KR | 10-0936197 | B1 | 1/2010 |
| KR | 10-2010-0129666 | A | 12/2010 |
| KR | 10-1205413 | B1 | 11/2012 |

* cited by examiner

LIQUID CRYSTAL DISPLAY AND DRIVING METHOD THEREOF

CROSS-REFERENCE TO RELATED APPLICATIONS

This application claims priority to and the benefit of Korean Patent Application No. 10-2013-0044347 filed in the Korean Intellectual Property Office on Apr. 22, 2013, the entire contents of which are incorporated herein by reference.

BACKGROUND

1. Field

The described technology generally relates to a liquid crystal display and a driving method thereof.

2. Description of the Related Technology

A liquid crystal display (LCD) is one of the most common types of flat panel displays. The LCD generally include two sheets of display panels, a liquid crystal layer interposed therebetween, a data driver, a gate driver, a signal controller, and a power generator. The display panels generally include field generating electrodes such as a pixel electrode, a common electrode, and the like. The data driver supplies a data voltage to the display panel. The gate driver supplies a gate signal to the display panel. The signal controller controls the data driver and the gate driver. The power generator generates a power voltage for driving the display panel. The LCD also typically include a plurality of signal lines such as a gate line and a data line for applying the data voltage to the pixel electrode by controlling a switching element connected to each pixel electrode.

The pixel electrode can be connected to the switching element such as a thin film transistor (TFT) to receive the data voltage. An opposing electrode can be formed on the entire surface of the display panel to receive a common voltage Vcom. The pixel electrode and the opposing electrode may be positioned on the same substrate or positioned on different substrates. A desired image may be displayed by applying the data voltage and the common electrode to the pixel electrode and the opposing electrode to generate an electric field in the liquid crystal layer and controlling an intensity of the electric field to control transmittance of light passing through the liquid crystal layer.

The LCD can receive an input image signal from an external graphic controller, the input image signal stores luminance information of each pixel, and each luminance has a predetermined number. Each pixel can receive a data voltage corresponding to luminance information. The data voltage that can be applied to the pixel is represented as a pixel voltage according to a difference from the common voltage applied to the common electrode, and each pixel displays luminance. This can be expressed by a gray of the image signal that correlates to a pixel voltage. In order to prevent deterioration, that can occur from applying the electric field in one direction to the liquid crystal layer for a long time, a polarity of the data voltage for a reference voltage is often inverted for each frame, for each row, for each column, or for each pixel. Further, in order to prevent spots such as a vertical line of a display screen from being generated, polarities of the pixel voltages applied to adjacent pixels are different from each other.

The data driver of the liquid crystal display selects a gray voltage corresponding to the input image signal to apply the selected gray voltage to the data line as a data voltage. In the case of polarity inversion driving, since the polarity for the common voltage of the data voltage is changed for each frame, for each row, for each column, or for each pixel, a change in voltage can be two times of the pixel voltage. The amount of power used by gray voltage is often increased. As a result, power used by the power generator and the data driver may be increased.

The above information disclosed in the background section is only for enhancement of understanding of the background of the described technology and therefore it may contain information that does not constitute prior art.

SUMMARY OF CERTAIN INVENTIVE ASPECTS

The described technology relates to a liquid crystal display, or an LCD, and a driving method for the same. One inventive aspect of the described technology is to reduce power consumption in a driver by lowering a power voltage.

In one exemplary embodiment a liquid crystal display, includes: a plurality of pixels, and a plurality of data lines. The plurality of pixels are arranged in a matrix form. The respective pixels include a liquid crystal capacitor. The liquid crystal capacitor includes a pixel electrode and a common electrode as two terminals. The plurality of data lines transfer data voltages to the pixels. Further, the pixels can include a first pixel and a second pixel, which are adjacent to each other, in a row direction or in a column direction. A first common signal can be applied to the common electrode of the first pixel, and a second common signal that is inverted to the first common signal can be applied to the common electrode of the second pixel. The first common signal and the second common signal can swing between a first voltage and a second voltage, which are different from each other per at least every one frame. The polarity of the data voltage transferred by a data line with respect to the first common signal or the second common signal is constant during one frame.

The polarity of the data voltage applied to the first pixel with respect to the first common signal may be opposite to the polarity of the data voltage applied to the second pixel with respect to the second common signal.

Polarities of the data voltages that can be applied to a predetermined number of pixels, which are adjacent to each other in a row direction or a in column direction with respect to the first common signal or the second common signal, may be the same as each other.

The plurality of pixels may respectively receive the data voltage through respective switching elements, and the switching elements of the plurality of pixels positioned in one column may be alternately connected to two data lines among the plurality of data lines per every a predetermined number of rows.

The liquid crystal display may further include: a plurality of gate lines and a plurality of blocks. The plurality of gate lines can transfer gate signals to the plurality of pixels. The plurality of gate lines can be arranged in a column direction. The plurality of blocks can be arranged in a column direction. Each of the plurality of blocks, including at least one pixel row, can have different swing times of the first common signal or the second common signal applied to the pixel. This can include different blocks among the plurality of blocks.

The swing times of the first common signal or the second common signal applied to the plurality of blocks may be sequentially positioned in one frame.

The liquid crystal display may further include a first common signal line transferring the first common signal; a second common signal line transferring the second common signal; and a common signal applying unit connected to the first common signal line and the second common signal line.

Each of the plurality of blocks may include two sub blocks, which are adjacent to each other in a row direction and separated from each other.

In another exemplary embodiment a liquid crystal display includes: a plurality of pixels, a plurality of data lines, and a plurality of gate lines The pixels can be arranged in a matrix form. The respective pixels can include a liquid crystal capacitor that has a pixel electrode and a common electrode as two terminals. The data lines can transfer data voltages to the plurality of pixels. The gate lines can transfer gate signals to the pixels and can be arranged in a column direction. The pixels can include a first pixel and a second pixel that are adjacent to each other in a row direction or in a column direction. The first common signal can be applied to the common electrode of the first pixel, and a second common signal that is inverted to the first common signal can be applied to the common electrode of the second pixel. The first common signal and the second common signal swing between a first voltage and a second voltage that can be different from each other per at least every one frame. The blocks can be arranged in a column direction. Each of the blocks can include at least one pixel row. The swing times of the first common signal or the second common signal applied to the pixel included in different blocks among the blocks can be different from each other.

The swing times of the first common signal or the second common signal applied to the plurality of blocks may be sequentially positioned in one frame.

The liquid crystal display may further include a first common signal line transferring the first common signal; a second common signal line transferring the second common signal; and a common signal applying unit connected to the first common signal line and the second common signal line.

Each of the plurality of blocks may include two sub blocks which can be adjacent to each other in a row direction and separated from each other.

A polarity of the data voltage transferred by a data line with respect to the first common signal or the second common signal may be constant during one frame.

A polarity of the data voltage applied to the first pixel with respect to the first common signal may be opposite to a polarity of the data voltage applied to the second pixel with respect to the second common signal.

Polarities of the data voltages applied to a predetermined number of pixels which are adjacent to each other in a row direction or a in column direction with respect to the first common signal or the second common signal may be the same as each other.

The plurality of pixels may respectively receive the data voltage through respective switching elements, and the switching elements of the plurality of pixels positioned in one column may be alternately connected to two data lines among the plurality of data lines per every predetermined number of rows.

In another exemplary embodiment, a driving method of a liquid crystal display can include: applying a first common signal, applying a second common signal, and applying to a data line a data voltage. The liquid crystal display can include a plurality of pixels arranged in a matrix form, and a plurality of data lines. The respective pixels can include a liquid crystal capacitor that has a pixel electrode and a common electrode as two terminals. The plurality of data lines can be connected to the plurality of pixels. The first common signal can be applied to the common electrode of a first pixel among the plurality of pixels. The second common signal, which is inverted to the first common signal, can be applied to the common electrode of a second pixel, which is adjacent to the first pixel in a row direction or in a column direction. The data line can have a data voltage, which has a polarity with respect to the first common signal or the second common signal that can be constant during one frame. The first common signal and the second common signal swing between a first voltage and a second voltage, which are different from each other per at least every one frame A polarity of the data voltage applied to the first pixel with respect to the first common signal may be opposite to a polarity of the data voltage applied to the second pixel with respect to the second common signal.

In another exemplary embodiment a driving method of a liquid crystal display can include: applying a first common signal, applying a second common signal, and applying data voltages to the plurality of data lines. The liquid crystal display can include a plurality of pixels arranged in a matrix form and a plurality of data lines connected to the plurality of pixels. The respective pixels can include a liquid crystal capacitor, which has a pixel electrode and a common electrode as two terminals. The first common signal can be applied to the common electrode of a first pixel among the plurality of pixels. The second common signal, which can be inverted to the first common signal, can be applied to the common electrode of a second pixel, which is adjacent to the first pixel in a row direction or in a column direction. The data voltages can be applied to the plurality of data lines. The first common signal and the second common signal can swing between a first voltage and a second voltage, which are different from each other per at least every one frame. The swing times of the first common signal or the second common signal, applied to the pixel included in different blocks among a plurality of blocks arranged in a column direction each, can include at least one pixel row are different from each other.

The swing times of the first common signal or the second common signal applied to the plurality of blocks may be sequentially positioned in one frame.

According to at least one of the disclosed embodiments, it is possible to reduce power consumption by lowering a power voltage of the liquid crystal display.

BRIEF DESCRIPTION OF THE DRAWINGS

FIG. 6 is a waveform diagram illustrating a common voltage and a range of a data voltage for the common voltage in the liquid crystal display that can be used with an exemplary embodiment of.

DETAILED DESCRIPTION OF CERTAIN INVENTIVE EMBODIMENTS

The described technology will be described more fully hereinafter with reference to the accompanying drawings, in which exemplary embodiments are shown. As those skilled in the art would realize, the described embodiments may be modified in various different ways, all without departing from the spirit or scope of the described technology. In this disclosure, the term "connected" includes electrical connection.

Hereinafter, a liquid crystal display and a driving method thereof according to an exemplary embodiment of the described technology will be further described with reference to the accompanying drawings.

First, a liquid crystal display according to an exemplary embodiment of the described technology will be described with reference to FIGS. 1 and 2.

Figure 1:
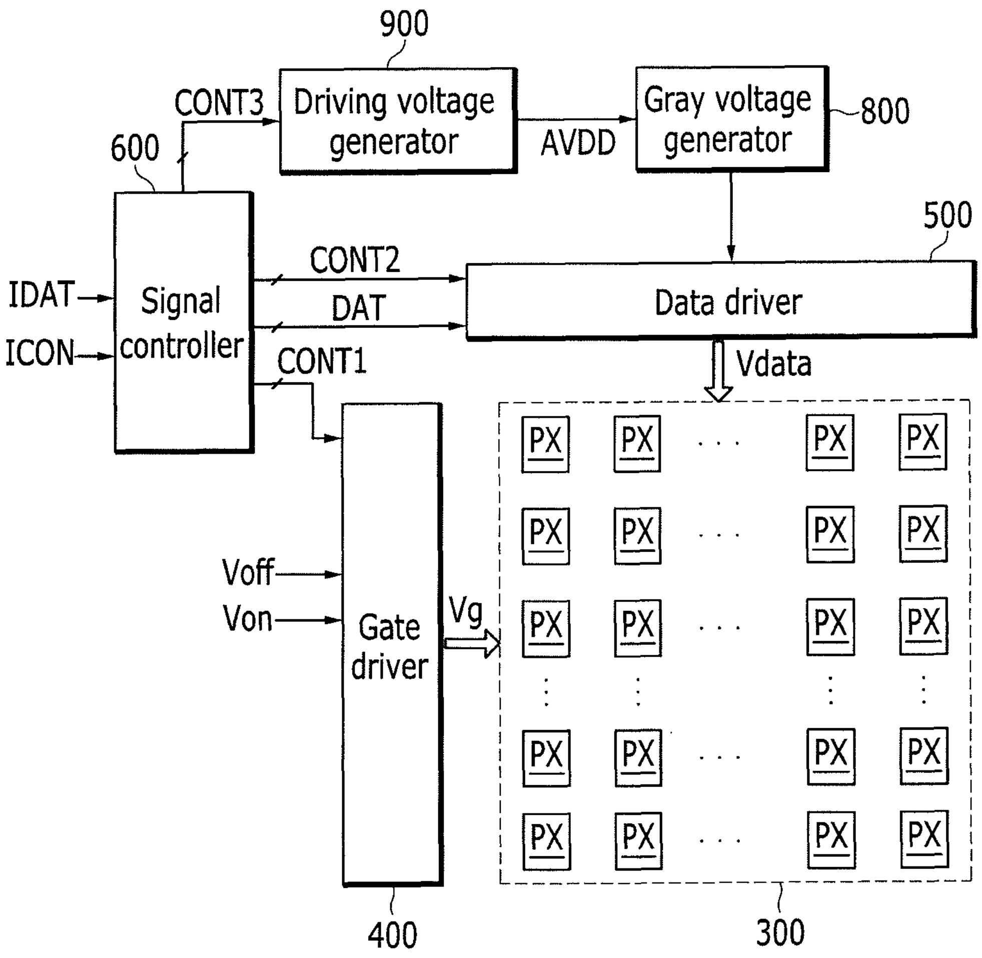
FIG. 1 is a block diagram illustrating a liquid crystal display according to one exemplary embodiment.
Figure 2:
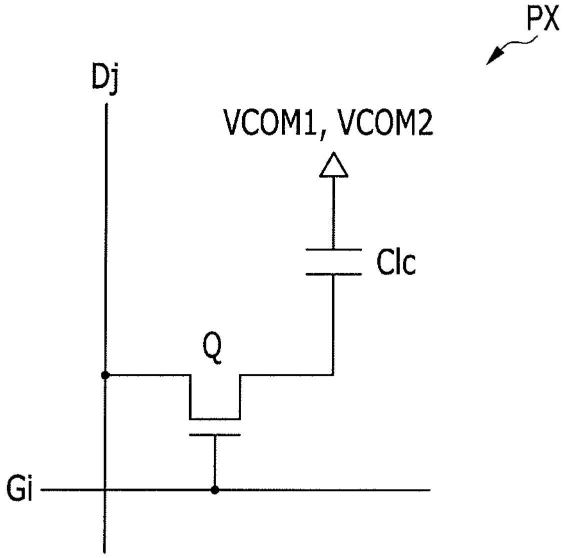
FIG. 2 is a schematic circuit diagram of one pixel of the liquid crystal display that can be used with an exemplary embodiment.

FIG. 1 is a block diagram illustrating a liquid crystal display according to one exemplary embodiment, and FIG. 2 is a schematic circuit diagram of one pixel of the liquid crystal display that can be used with the exemplary embodiment.

Referring to FIG. 1, a liquid crystal display includes a liquid crystal panel assembly 300, a gate driver 400, a data driver 500, a driving voltage generator 900, a gray voltage generator 800, and a signal controller 600.

The liquid crystal panel assembly 300 includes a plurality of pixels PX connected to a plurality of signal lines and arranged in a substantially matrix form. When viewed from a cross-sectional structure, the liquid crystal panel assembly 300 includes a lower display panel (not illustrated) and an upper display panel (not illustrated) facing each other, and a liquid crystal layer (not illustrated) interposed between the display, panels.

Referring to FIG. 2, the signal lines include a plurality of gate lines Gi transferring gate signals Vg and a plurality of data lines Dj transferring data voltages Vdata. The gate lines Gi may extend substantially in a row direction and be substantially parallel to each other, and the data lines Dj may extend substantially in a column direction and be substantially parallel to each other.

A pixel PX connected to the i-th gate line Gi and the j-th data line Dj, which includes a switching element Q connected to the gate line Gi and the data line Dj, and a liquid crystal capacitor Clc connected to the switching element Q. This pattern can be used for each pixel.

One terminal of the liquid crystal capacitor Clc is a pixel electrode connected with the switching element Q, and the other terminal is a common electrode which is an opposing electrode generating an electric field in the liquid crystal layer together with the pixel electrode. The pixel electrode receives a data voltage from the switching element Q. The common electrode receives a first common signal VCOM1 or a second common signal VCOM2 as a common voltage according to a position of the pixel PX. The common electrode may be positioned on the same display panel as the pixel electrode or on a different display panel from the pixel electrode.

The liquid crystal layer has dielectric anisotropy, and liquid crystal molecules of the liquid crystal layer may be aligned so that long axes thereof are vertical or horizontal to, or form a predetermined angle with surfaces of the two display panels while the electric field is not applied. The liquid crystal layer functions as a dielectric material of the liquid crystal capacitor Clc.

In order to implement color display, each pixel PX uniquely displays one of primary colors (spatial division) or alternately displays the primary colors with time (temporal division) so that a desired color is recognized by the spatial and temporal sum of the primary colors. An example of the primary colors may include three primary colors, red, green, and blue.

Referring back to FIG. 1, the gray voltage generator 800 can generate all gray voltages or a predetermined number of gray voltages (hereinafter, referred to as "reference gray voltages") related to transmittance of the pixel PX based on a driving voltage AVDD. The (reference) gray voltages may include positive gray voltages and negative gray voltages with respect to the first common signal VCOM1 or the second common signal VCOM2 which is the common voltage. The lowest gray voltage and the highest gray voltage among the gray voltages may have a predetermined difference by considering a margin with a voltage of the first common signal VCOM1 or the second common signal VCOM2. A range of the positive gray voltages and a range of the negative gray voltages may be the same as each other or different from each other. In the case where the range of the positive gray voltages and the range of the negative gray voltages are different from each other, at least a part of the two ranges may be overlapped with each other.

The gate driver 400 is connected to the gate lines Gi of the liquid crystal panel assembly 300 to apply gate signals Vg configured by a combination of a gate-on voltage Von and a gate-off voltage Voff, to the gate lines.

The data driver 500 is connected to the data lines Dj of the liquid crystal panel assembly 300, and selects gray voltages from the gray voltage generator 800 and applies the selected gray voltages to the data lines Dj as data voltages Vdata. However, in the case where the gray voltage generator 800 does not provide all the gray voltages, but provides only a predetermined number of reference gray voltages, the data driver 500 generates desired data voltages Vdata by dividing the reference gray voltages.

The gray voltage generator 800 according to another exemplary embodiment of the described technology may be included in the data driver 500.

The driving voltage generator 900 generates voltages for driving of the liquid crystal display such as the driving voltage AVDD, the gate-on voltage Von, and the gate-off voltage Voff. The driving voltage AVDD is supplied to the gray voltage generator 800 as a voltage to generate the (reference) gray voltage, and the gate-on voltage Von and the gate-off voltage Voff are supplied to the gate driver 400 in order to generate the gate signal Vg.

The signal controller 600 controls the gate driver 400, the data driver 500, the driving voltage generator 900, and the like.

Then, a driving method of the liquid crystal display will be described with reference to FIGS. 1 and 2.

The signal controller 600 can receive an input image signal IDAT and an input control signal ICON controlling a display of the input image signal IDAT from an external graphic controller (not illustrated). The input image signal IDAT stores luminance information of each pixel PX, and luminance can have a predetermined number of grays, for example, 1024 (=$2^{10}$), 256 (=$2^8$), or 64 (=$2^6$) grays. An example of the input control signal ICON includes a vertical synchronization signal Vsync, a horizontal synchronization signal Hsync, a main clock signal MCLK, a data enable signal DE, and the like.

The signal controller 600 appropriately processes the input image signal IDAT based on the input image signal IDAT and the input control signal ICON in accordance with an operational condition of the liquid crystal panel assembly 300 to generates a gate control signal CONT1, a data control signal CONT2, and the like. The signal controller 600 transmits the gate control signal CONT1 to the gate driver 400, and transmits the data control signal CONT2 and the processed image signal DAT to the data driver 500. Further, the signal controller 600 generates a driving voltage control signal CONT3 based on the input image signal IDAT and the input control signal ICON and then transmits the generated driving voltage control signal CONT3 to the driving voltage generator 900.

The driving voltage generator 900 generates voltages such as the driving voltage AVDD, the gate-on voltage Von, and the gate-off voltage Voff according to the driving voltage control signal CONT3 from the signal controller 600. The driving voltage generator 900 transmits the driving voltage AVDD to the gray voltage generator 800 and transmits the gate-on voltage Von and the gate-off voltage Voff to the gate driver 400.

The gray voltage generator 800 generates the reference gray voltage or the gray voltage by dividing the driving voltage AVDD.

The data driver 500 can receive digital image signals DAT for pixels PX in one data row according to the data control signal CONT2 and can select a gray voltage corresponding to each digital image signal DAT to convert the digital image signal DAT into an analog data voltage Vdata and then apply the converted analog data voltage Vdata to the corresponding data line Dj.

The gate driver 400 can apply a gate-on voltage Von to the gate line Gi according to the gate control signal CONT1 from the signal controller 600 to turn on the switching element Q connected to the gate line Gi. Then, the data voltage Vdata applied to the data line Dj is applied to the pixel electrode of the corresponding pixel PX through the turned-on switching element Q. When the first common signal VCOM1 or the second common signal VCOM2 is applied to the common electrode facing the pixel electrode and the data voltage Vdata is applied to the pixel electrode, a voltage difference between the two electrodes is represented as a pixel voltage of each pixel PX. When the liquid crystal molecules of the liquid crystal layer between the two electrodes are tilted according to the pixel voltage, a change in the angle of polarization of light passing through the liquid crystal layer can vary according to the tilted degree, and as a result, the pixel PX displays luminance represented by a gray of the input image signal IDAT.

The process is repeated by setting 1 horizontal period as a unit, and as a result, the gate-on voltages Von are sequentially applied to all the gate lines Gi and the data voltages Vdata are applied to all the pixels PX to display images for one frame.

When one frame ends, the next frame starts, and a state of an inversion signal applied to the data driver 500 may be controlled so that a polarity of the data voltage Vdata applied to each pixel PX is opposite to a polarity in the previous frame ("frame inversion"). Even in one frame, a polarity of the data voltage Vdata flowing through one of the data lines Dj is periodically changed according to a characteristic of the inversion signal (row inversion, dot inversion). The polarities of the data voltages Vdata applied to the data lines Dj in one pixel row may be different from each other (column inversion, dot inversion). The inversion characteristic of the data voltage Vdata may vary according to a connection relationship of the switching elements Q of the pixels PX.

The structure of the liquid crystal display according to an exemplary embodiment of will be described in further detail with reference to FIG. 3.

Figure 3:
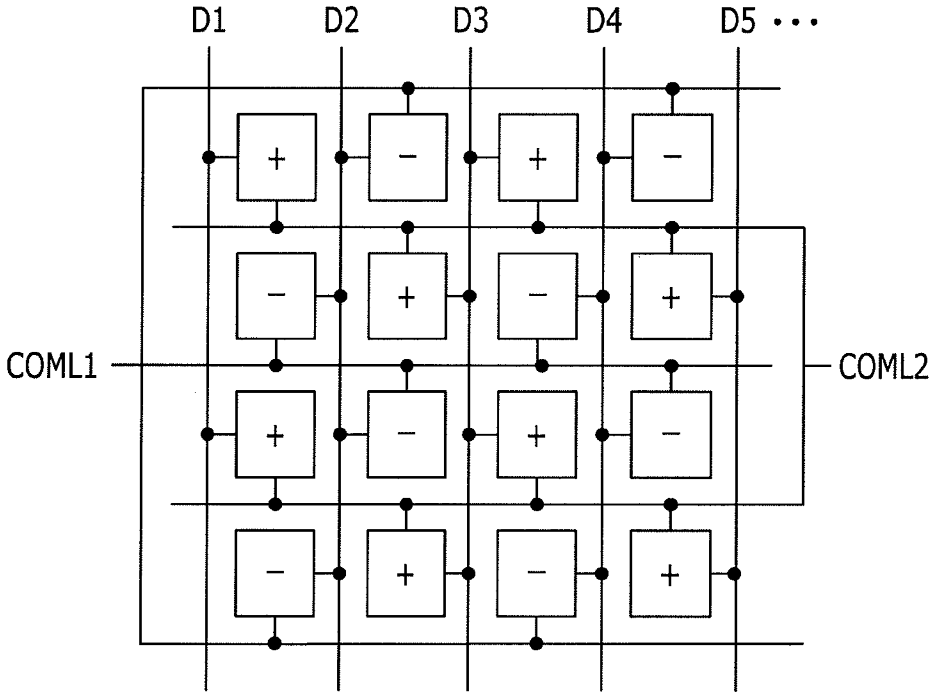
FIG. 3 is a layout view of pixels and signal lines of the liquid crystal display that can be used with an exemplary embodiment.

FIG. 3 is a layout view of pixels and signal lines of the liquid crystal display according to an exemplary embodiment.

Referring to FIG. 3, the pixels PX of the liquid crystal display according to the may be formed in a matrix form.

Pixel electrodes of pixels PX formed in one pixel column are alternately connected to two adjacent data lines D1, D2, . . . through a switching element (not illustrated) to receive a data voltage. Accordingly, in the case of column inversion driving in which, one data line D1, D2, . . . transfers a data voltage having a constant polarity with respect to the first common signal VCOM1 or the second common signal VCOM2 during a frame. Adjacent data lines D1, D2, . . . transfer data voltages having different polarities, polarities of data voltages of adjacent pixels PX in a row direction or adjacent pixels PX in a column direction are different from each other with respect to the first common signal VCOM1 or the second common signal VCOM2. As a result, 1×1 dot inversion driving may be implemented.

Furthermore, when a connection relationship between the pixels and the data lines D1, D2, . . . and inversion driving of the data voltage are controlled, various kinds of dot inversion driving may be performed. The polarities of the data voltages of a predetermined number of pixels PX, which are adjacent to each other in a row direction or a column direction, are the same as each other, and a group of the predetermined number of pixels PX forms one dot. For example, in the case where the polarities of the data voltages of two adjacent pixels PX in a row direction are the same as each other and the polarities of the data voltages of two adjacent pixels PX in a column direction are different from each other, 1×2 dot inversion driving may be implemented.

The common electrode of the pixel PX is connected to any one of a first common signal line COML1 transferring to a first common signal VCOM1 and a second common signal line COML2 transferring a second common signal VCOM2. The pixels PX displaying a positive (+) polarity for one frame may be connected to the first common signal line COML1, and the pixels PX displaying a negative (−) polarity may be connected to the second common signal line COML2. For example, in order to implement the 1×1 dot inversion, when one pixel PX is connected to the first common signal line COML1, a pixel PX adjacent to the corresponding pixel PX in a row direction or a column direction may be connected to the second common signal line COML2. As another example, in order to implement the 1×2 dot inversion, when two adjacent pixels PX in a row direction are connected to the first common signal line COML1, a pixel PX adjacent to the corresponding pixels PX in a row direction or a column direction may be connected to the second common signal line COML2.

A driving method of a liquid crystal display according to one exemplary embodiment will be described in further detail in reference to FIGS. 4 to 6, which can be used with other embodiments.

Figure 4:
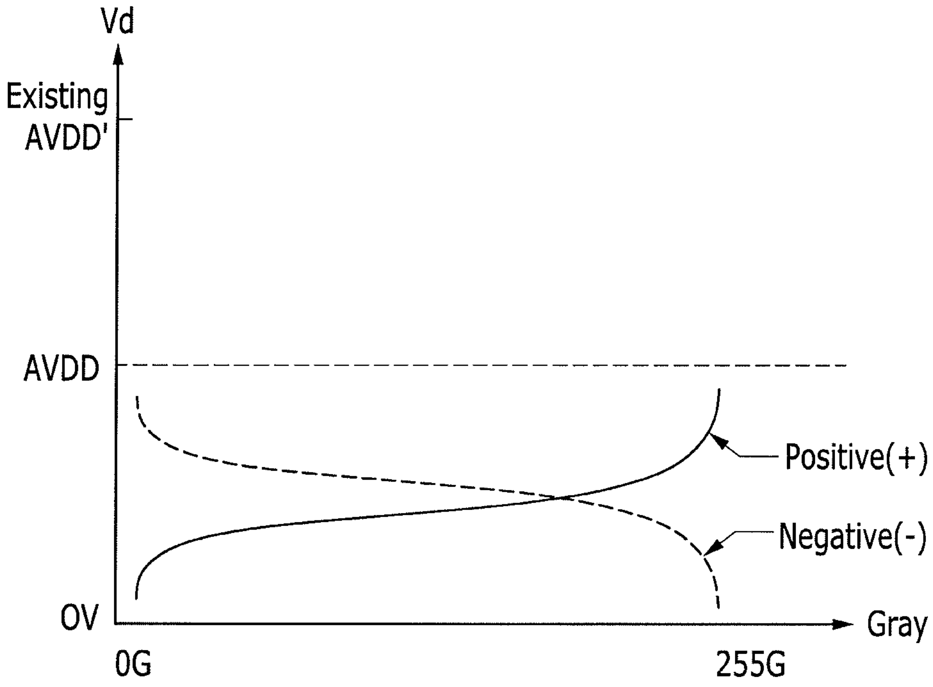
FIG. 4 is a graph illustrating a data voltage for a gray in the liquid crystal display that can be used with an exemplary embodiment.

FIG. 4 is an exemplary graph illustrating a data voltage for a gray in the liquid crystal display according to an exemplary embodiment. FIG. 5 is an exemplary waveform diagram illustrating a common voltage and a range of a data voltage for the common voltage in the liquid crystal display. FIG. 6 is an exemplary waveform diagram illustrating a common voltage and a range of a data voltage for the common voltage in the liquid crystal display.

Referring to FIG. 4, a range of a negative (−) data voltage Vd and a range of a positive (+) data voltage Vd of the liquid crystal display may be at least partially overlapped with each other. That is, the range of the negative gray voltage and the range of the positive gray voltage may be at least partially overlapped with each other. Hereinafter, the range of the data voltage means a range of the gray voltage or a range of the data voltage.

FIG. 4 illustrates an example in which the range of the negative (−) data voltage Vd and the range of the positive (+) data voltage Vd are the same as each other. Further, FIG. 4 illustrates an example in which the number of entire grays is 256, but it is not limited thereto.

Both the negative (−) data voltage Vd and the positive (+) data voltage Vd may have a value between 0 V which is a ground voltage and the driving voltage AVDD. Accordingly, a magnitude of the driving voltage AVDD for generating the gray voltage becomes approximately ½ smaller than an existing driving voltage AVDD' for generating a positive gray voltage and a negative gray voltage which are located in different ranges with respect to a constant common voltage. That is, the existing driving voltage AVDD' is a continuously distributed driving voltage in which the range of the negative (−) data voltage Vd is 0 V to 0.5*AVDD' and the range of the positive (+) data voltage Vd is 0.5*AVDD' to AVDD'. Accordingly, according to an exemplary embodiment of the described technology, power consumption of the gray voltage generator 900 and the data driver 500 may be reduced.

A minimum voltage of the positive (+) data voltage Vd and the negative (−) data voltage Vd may be the same as 0 V which is the ground voltage or larger than 0 V by a predetermined voltage, and a maximum voltage of the positive (+) data voltage Vd and the negative (−) data voltage Vd may be the same as the driving voltage AVDD or smaller than the driving voltage AVDD by a predetermined voltage. Further, both the negative (−) data voltage Vd and the positive (+) data voltage Vd may have a value having substantially inverted symmetry based on a voltage level which is approximately ½ of the driving voltage AVDD.

Figure 5:
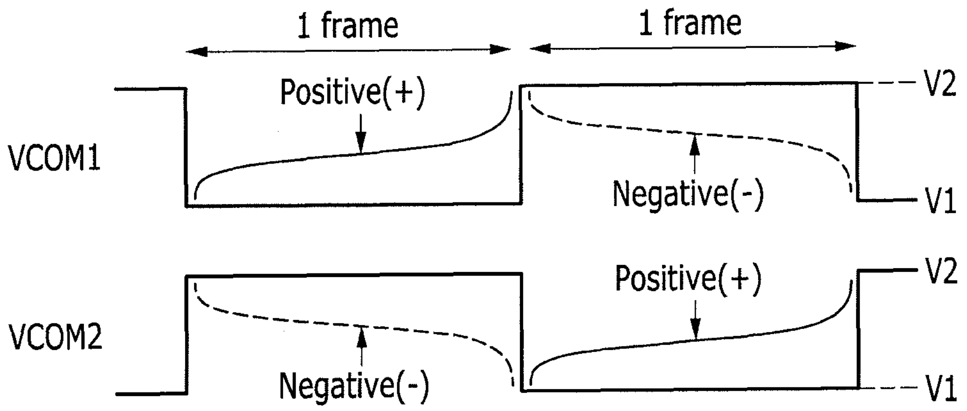
FIG. 5 is a waveform diagram illustrating a common voltage and a range of a data voltage for the common voltage in the liquid crystal display that can be used with an exemplary embodiment.
Figure 6:
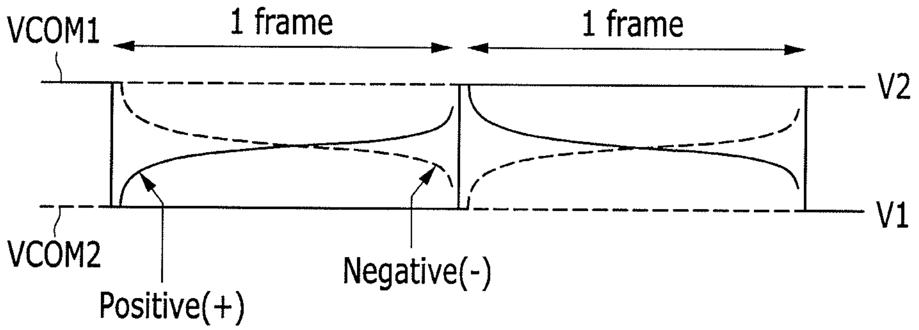

Referring to FIGS. 5 and 6, a common voltage applied to the common electrode of the pixel PX for frame inversion driving swings per at least one frame unit. For example, the first common signal VCOM1 and the second common signal VCOM2 as the common voltage applied to the common electrode swing per at least one frame unit and may maintain substantially the same voltage level for the same frame. FIG. 5 illustrates an example in which the first common signal VCOM1 and the second common signal VCOM2 swing for each frame.

As illustrated in FIG. 4, when the range of the negative (−) data voltage Vd and the range of the and the positive (+) data voltage Vd are the same as each other, as illustrated in FIGS. 5 and 6, the swing range of the first common signal VCOM1 may be the same as the swing range of the second common signal VCOM2. That is, the first common signal VCOM1 and the second common signal VCOM2 may swing between a first voltage V1 which is a low level and a second voltage V2 which is a high level per at least one frame. When one pixel PX receives the positive (+) data voltage, the common electrode of the corresponding pixel PX receives the first voltage V1 which is a low level, and when one pixel PX receives the negative (−) data voltage, the common electrode of the corresponding pixel PX receives the second voltage V2 which is a high level.

The first voltage V1 may be 0 V, and the second voltage V2 may be the driving voltage AVDD. That is, a swing width between the first common signal VCOM1 and the second common signal VCOM2 may be substantially the driving voltage AVDD.

The first common signal VCOM1 and the second common signal VCOM2 have different voltage levels during one frame. The first common signal VCOM1 and the second common signal VCOM2 may have waveforms, which are inverted to each other.

Next, a driving method of a liquid crystal display will be described in further detail with reference to FIGS. 7 and 8.

Figure 7:
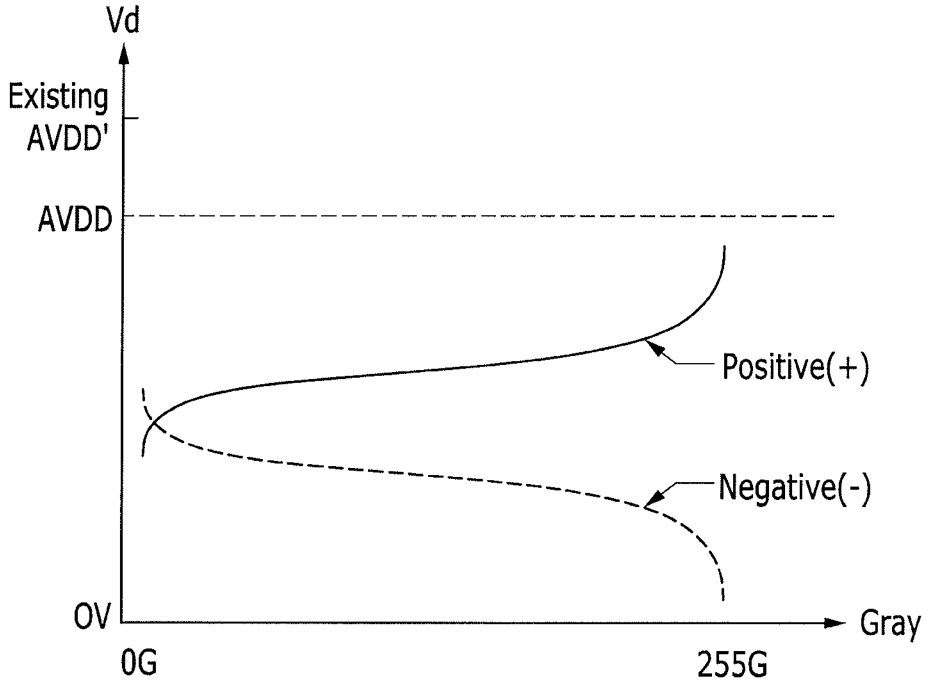
FIG. 7 is a graph illustrating a data voltage for a gray in the liquid crystal display that can be used with an exemplary embodiment.

FIG. 7 is an exemplary graph illustrating a data voltage for a gray in the liquid crystal display. FIG. 8 is an exemplary waveform diagram illustrating a common voltage and a range of a data voltage for the common voltage in the liquid crystal display.

Both the negative (−) data voltage Vd and the positive (+) data voltage Vd may have a value between 0 V which is a ground voltage and the driving voltage AVDD. Further, a voltage range of each of the negative (−) data voltage Vd and the positive (+) data voltage Vd corresponds to approximately a half of the existing driving voltage AVDD' described above. Further, an example in which the number of entire grays is 256 is illustrated, but it is not limited thereto.

However, the range of the negative (−) data voltage Vd and the range of the positive (+) data voltage Vd are not the same as each other, but may be partially overlapped with each other. That is, the range of the negative (−) gray voltage and the range of the positive (+) gray voltage may be at least partially overlapped with each other. The overlapped range of the negative (−) data voltage Vd and the positive (+) data voltage Vd is a predetermined voltage range smaller than the driving voltage AVDD and has a central level of a voltage level which is approximately ½ of the driving voltage AVDD. In more detail, a width of the overlapped range of the negative (−) data voltage Vd and the positive (+) data voltage Vd may be the same as the swing amplitude of the first common signal VCOM1 or the second common signal VCOM2. Accordingly, a magnitude of the driving voltage AVDD required for generating the gray voltage becomes smaller than an existing driving voltage AVDD' required for generating the negative (−) data voltage Vd and the positive (+) data voltage Vd which are in different ranges from each other with respect to a constant common voltage. Accordingly, power consumption of the gray voltage generator 900 and the data driver 500 may be reduced.

For example, in the case where the width of the overlapped range of the negative (−) data voltage Vd and the positive (+) data voltage Vd is (1−a)AVDD' ($0.5<a<1$), the driving voltage AVDD according to an exemplary embodiment may be decreased to a*AVDD'.

Figure 8:
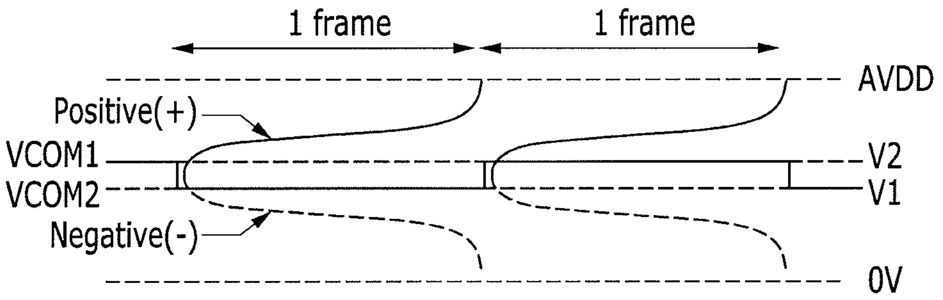
FIG. 8 is a waveform diagram illustrating a common voltage and a range of a data voltage for the common voltage in the liquid crystal display that can be used with an exemplary embodiment.

Referring to FIG. 8, the swing range of the first common signal VCOM1 and the swing range of the second common signal VCOM2 may be the same as each other. That is, the first common signal VCOM1 and the second common signal VCOM2 may swing between a first voltage V1 which is a low level and a second voltage V2 which is a high level for at least one frame. When one pixel PX receives the positive (+) data voltage, the common electrode of the corresponding pixel PX receives the first voltage V1 which is a low level, and when one pixel PX receives the negative (−) data voltage, the common electrode of the corresponding pixel PX receives the second voltage V2 which is a high level.

According to one exemplary embodiment, the first voltage V1 and the second voltage V2 are voltages between 0 V and the driving voltage AVDD, and a difference between the first voltage V1 and the second voltage V2 may be smaller than the driving voltage AVDD. In more detail, the difference between the first voltage V1 and the second voltage V2 may be (1−a) AVDD' (0.5<a<1), as the overlapped range of the negative (−) data voltage Vd and the positive (+) data voltage Vd.

Next, a liquid crystal display and a driving method thereof according to an exemplary embodiment of the described technology will be described in detail with reference to FIGS. 9 and 10.

Figure 9:
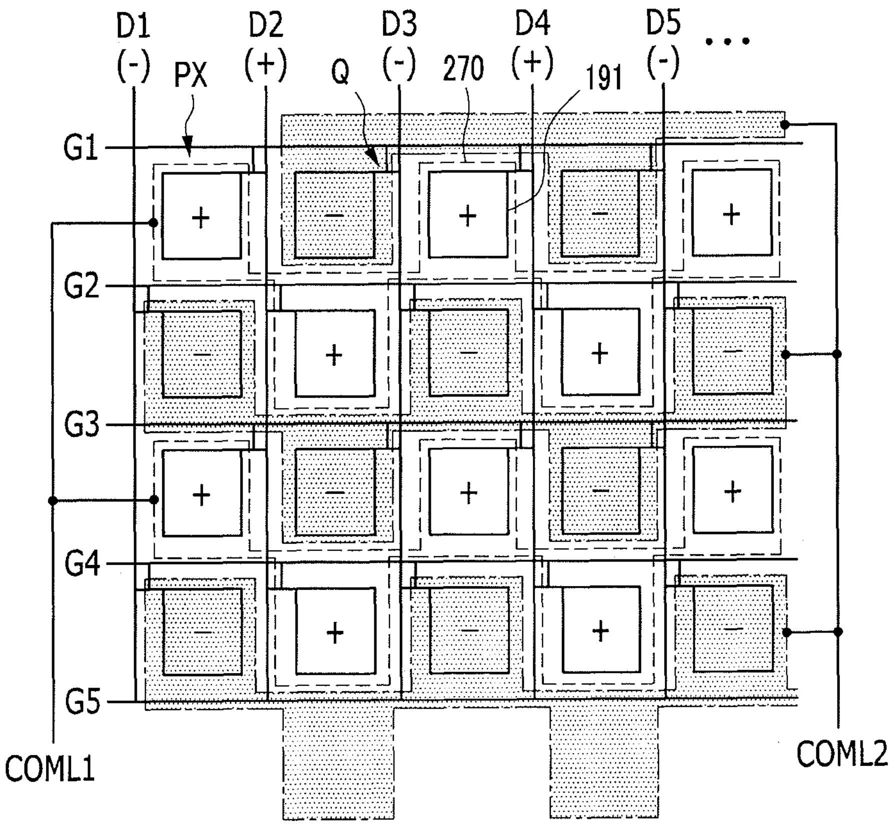
FIG. 9 is a layout view of a liquid crystal display according to one exemplary embodiment.

FIG. 9 is an exemplary layout view of a liquid crystal display. FIG. 10 is an exemplary waveform diagram illustrating a common voltage and a range of a data voltage for the common voltage in the liquid crystal display.

Referring to FIG. 9, the liquid crystal display is similar to the exemplary embodiment illustrated in FIG. 3. Pixel electrodes 191 of pixels PX in each pixel row may be connected to gate lines G1, G2, . . . corresponding to the pixel electrodes through the switching elements Q, but are not limited thereto. Further, the switching elements Q of the pixels PX formed in one pixel column are alternately connected to two adjacent data lines D1, D2, . . . to receive data voltages. Further, positions of the switching elements Q are the same as each other for each pixel PX in one pixel row. Accordingly, in the case of column inversion driving in which one data line D1, D2, . . . transfers a data voltage having the same polarity for the first common signal VCOM1 or the second common signal VCOM2 during one frame and adjacent data lines D1, D2, . . . transfer data voltages having different polarities, polarities of data voltages for the first common signal VCOM1 or the second common signal VCOM2 of adjacent pixels PX in a row direction or adjacent pixels PX in a column direction are different from each other, and as a result, the liquid crystal display may be implemented at 1×1 dot inversion driving.

The common electrode 270 of each pixel PX can be connected to any one of a first common signal line COML1 transferring to a first common signal VCOM1 and a second common signal line COML2 transferring a second common signal VCOM2. In the case of the exemplary embodiment, in order to implement the 1×1 dot inversion, when the common electrode 270 of one pixel PX is connected to the first common signal line COML1, a common electrode 270 of a pixel PX adjacent to the corresponding pixel PX in a row direction or a column direction may be connected to the second common signal line COML2.

The common electrodes 270 of the pixels PX connected to the first common signal line COML1 may form a first check pattern. The first common signal line COML1 is directly connected to the common electrode 270 of the pixel PX positioned at the edge, and the rest of the common electrodes 270 may be connected to the adjacent common electrodes 270 in a diagonal direction. That is, the common electrodes 270 of the pixels PX in the odd numbered row of one pixel column may be connected with the common electrodes 270 of the pixels PX in the even numbered row of an adjacent pixel column. The connected common electrodes 270 may be positioned throughout at least two pixel rows.

The common electrodes 270 of the pixels PX connected to the second common signal line COML2 may form a second check pattern, which is inverted to the first check pattern. The second common signal line COML2 is directly connected to the common electrode 270 of the pixel PX positioned at the edge, and the rest of the common electrodes 270 may be connected to the adjacent common electrodes 270 in a diagonal direction. That is, the common electrodes 270 of the pixels PX in the odd numbered row of one pixel column may be connected with the common electrodes 270 of the pixels PX in the even numbered row of an adjacent pixel column. The connected common electrodes 270 may be positioned throughout at least two pixel rows.

Figure 10:
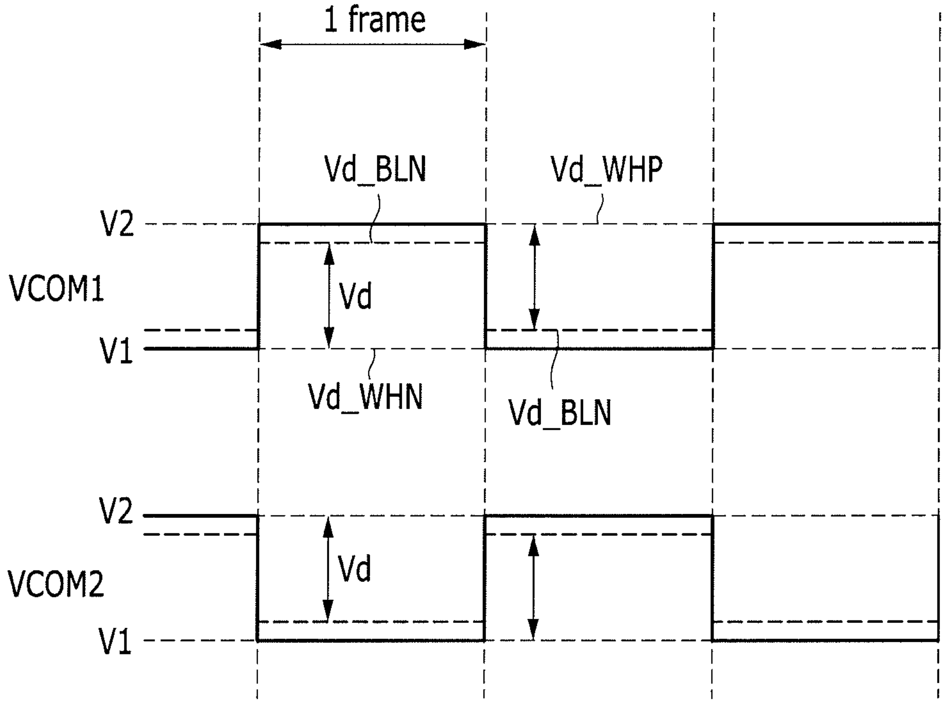
FIG. 10 is a waveform diagram illustrating a common voltage and a range of a data voltage for the common voltage in the liquid crystal display that can be used with an exemplary embodiment.

Referring to FIG. 10 together with FIG. 9, the first common signal VCOM1 transferring to the first common signal VCOM1 and the second common signal VCOM2 have the inversion form and swing between a first voltage V1 and a second voltage V2 per at least one frame unit, respectively. A difference between the first voltage V1 and the second voltage V2, that is, the swing width of the first common signal VCOM1 and the second common signal VCOM2 may be larger than 0 and may be smaller than or the same as the driving voltage AVDD. Further, a medium voltage level of the first voltage V1 and the second voltage V2 may be approximately 0.5*AVDD.

When the difference between the first voltage V1 and the second voltage V2 is substantially the same as the driving voltage AVDD, the first voltage V1 may be approximately 0 V, and the second voltage V2 may be approximately the driving voltage AVDD. Further, when the difference between the first voltage V1 and the second voltage V2 is smaller than the driving voltage AVDD, the first voltage V1 may be larger than 0 V, and the second voltage V2 may be smaller than the driving voltage AVDD.

When the first common signal VCOM1 or the second common signal VCOM2 is the first voltage V1, the positive (+) data voltage Vd is applied, and when the first common signal VCOM1 or the second common signal VCOM2 is the second voltage V2, the negative (−) data voltage Vd is applied.

The range of the positive (+) data voltage Vd is from a positive black data voltage Vd_BLP to a positive white data voltage Vd_WHP, and the range of the negative (−) data voltage Vd is from a negative black data voltage Vd_BLN to a negative white data voltage Vd_WHN. The positive black data voltage Vd_BLP is the same as or larger than the first voltage V1, and the negative black data voltage Vd_BLN is the same as or smaller than the second voltage V2. Further, the positive white data voltage Vd_WHP may be larger than or the same as the second voltage V2 and may have a predetermined voltage value, which is lower than the second voltage V2. Further, the negative white data voltage Vd_WHN may be smaller than or the same as the first voltage V1 and may have a predetermined voltage value, which is higher than the first voltage V1.

As described above, a width of the range of the positive (+) data voltage Vd or a width of the range of the negative (−) data voltage Vd is smaller than or the same as the driving voltage AVDD, and corresponds to approximately a half of the existing driving voltage AVDD'.

When the swing width of the first common signal VCOM1 or the second common signal VCOM2 is approximately the driving voltage AVDD, the range of the positive (+) data voltage Vd and the range of the negative (−) data voltage Vd may be the same as each other. FIG. 10 illustrates an example in which swing widths of the first common signal VCOM1 and the second common signal VCOM2 are substantially the driving voltage AVDD. In this case, the first voltage V1 may be approximately 0 V, and the second voltage V2 may be approximately the driving voltage AVDD. The positive white data voltage Vd_WHP is approximately the same as the second voltage V2 or smaller than a predetermined voltage, and the negative white data voltage Vd_WHN may be substantially the same as the first voltage V1 or larger than the first voltage V1 by a predetermined voltage.

A liquid crystal display and a driving method thereof according to an exemplary embodiment will be described with reference to FIGS. 11 to 14. The same constituent elements as the exemplary embodiments described above designate the same reference numerals.

FIGS. 11 to 14 are different exemplary layout views of a liquid crystal display.

Figure 11:
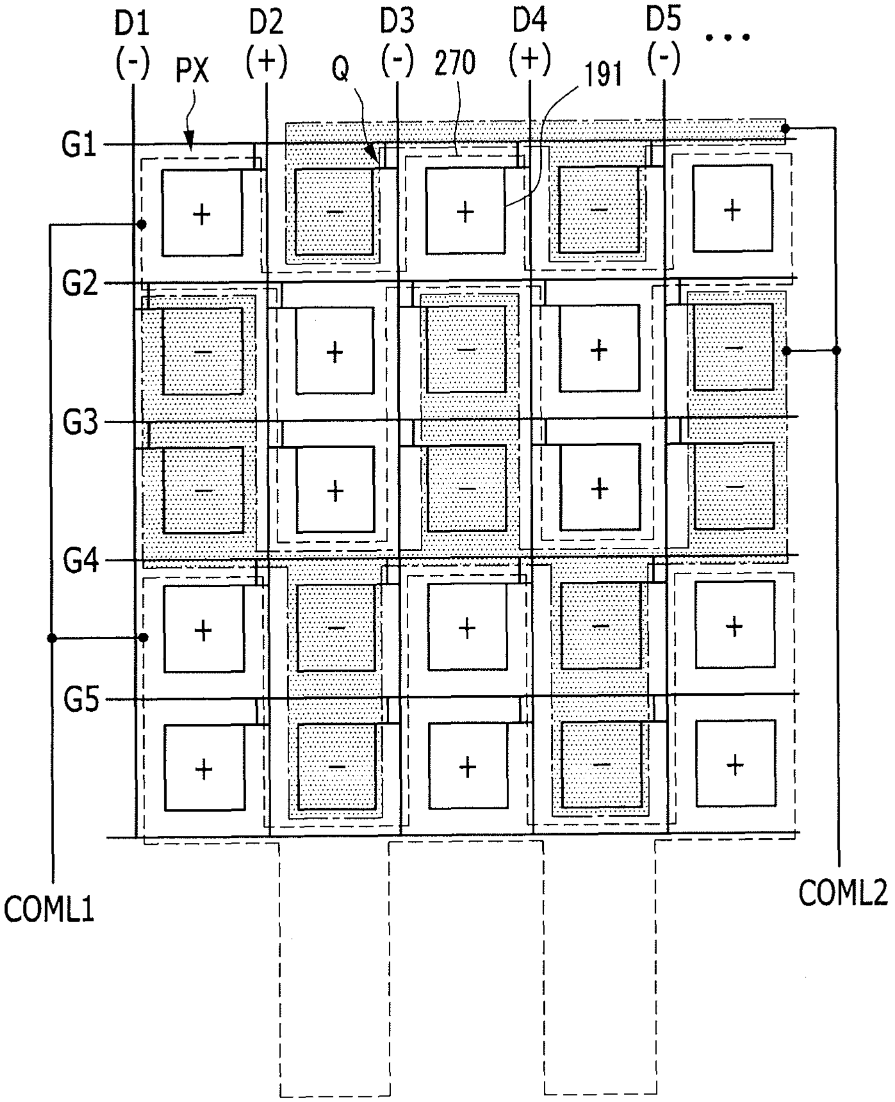
FIGS. 11 to 14 are layout views of a liquid crystal display that can be used with exemplary embodiments.

First, the FIG. 11 embodiment is similar to the embodiment illustrated in FIGS. 9 and 10 described above, but positions of the switching elements Q and dot inversion driving forms may be different from each other.

The switching elements Q of the pixels PX formed in one pixel column are alternately connected to two adjacent data lines D1, D2, . . . per every p pixels PX (p is a natural number of 2 or more) to receive data voltages. In this case, a switching element Q of the uppermost pixel PX in one pixel column may be connected to one of the data lines D1, D2, . . . which is different from a switching element of a second pixel PX. Further, positions of the switching elements Q in one pixel row are the same as each other for each pixel PX. Accordingly, in the case of column inversion driving in which one data line D1, D2, . . . transfers a data voltage having the same polarity for the first common signal VCOM1 or the second common signal VCOM2 during one frame and adjacent data lines D1, D2, . . . transfer data voltages having different polarities, polarities of data voltages for the first common signal VCOM1 or the second common signal VCOM2 are opposite to each other for every adjacent pixels PX in a row direction and for every two pixels PX in one pixel column, and as a result, a 1+p×1 dot inversion driving form may be implemented. FIG. 11 illustrates a 1+2×1 dot inversion driving form as an example.

Further, in order to implement p×1 dot inversion except for the first pixel row, the common electrodes 270 are connected to different common signal lines COML1 and COML2 for every two pixels PX in one pixel column. That is, when the common electrodes 270 of two adjacent pixels PX positioned in one pixel column are connected to the first common signal line COML1, common electrodes 270 of two adjacent pixels PX to the two corresponding pixels PX in a row direction or a column direction may be connected to the second common signal line COML2.

The structural characteristic of the common electrode 270 and the characteristics of the first common signal VCOM1 and the second common signal VCOM2 are similar to the exemplary embodiments described above.

Figure 12:
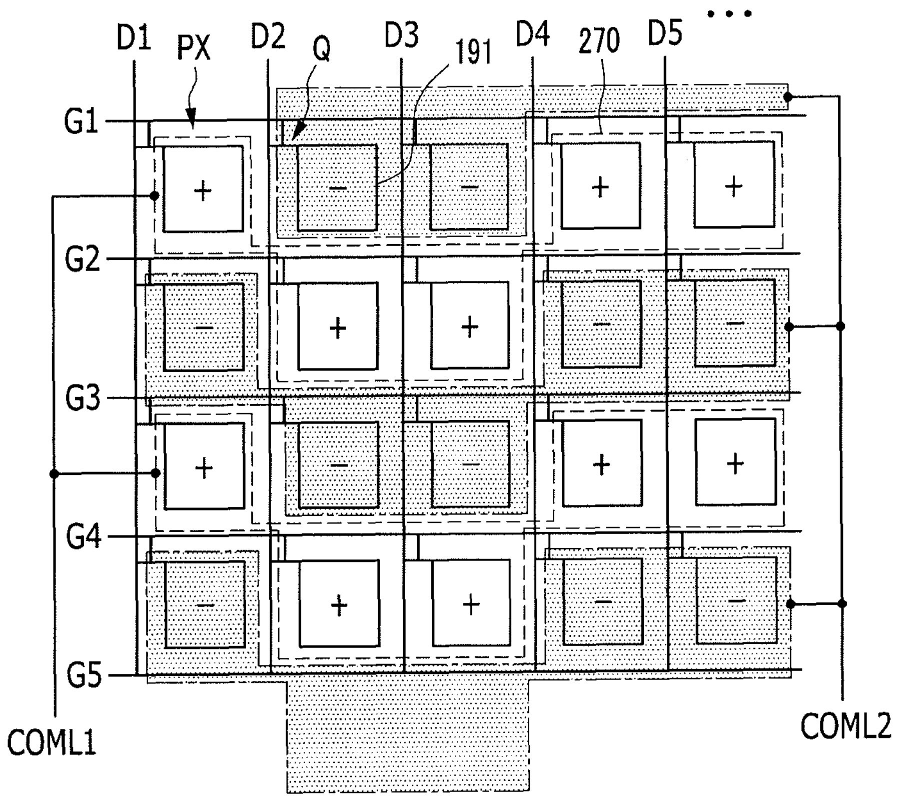

Next, the FIG. 12 embodiment is similar to the exemplary embodiments illustrated in FIGS. 9 and 10 described above, but positions of the switching elements Q and dot inversion driving forms may be different from each other.

Positions of the switching elements Q in one pixel column may be the same as each other for each pixel PX, and positions of the switching elements Q in one pixel row may be the same as each other for each pixel PX. However, the positions of the switching elements Q are not limited to those illustrated in the drawing, but may be variously changed. Further, a polarity of a data voltage transferred by one of the data lines D1, D2, . . . during a frame may not be constant, but be changed. For example, according to the exemplary embodiment illustrated in FIG. 12, polarities of data voltages transferred by one of the data lines D1, D2, . . . are inverted for each pixel row, and then as illustrated in FIG. 12, polarities of data voltages for the first common signal VCOM1 or the second common signal VCOM2 are opposite to each other for every adjacent pixels PX in a row direction and for every two pixels PX in one pixel row, and as a result, a 1+1×p (p is a natural number of 2 or more) dot inversion driving form may be implemented. FIG. 12 illustrates a 1+1×2 dot inversion driving form as an example.

Further, in order to implement 1×p dot inversion except for the first pixel column, the common electrodes 270 are connected to different common signal lines COML1 and COML2 for every two pixels PX in one pixel row. That is, when the common electrodes 270 of two adjacent pixels PX positioned in one pixel row are connected to the first common signal line COML1, common electrodes 270 of two pixels PX adjacent to the two corresponding pixels PX in a row direction or a column direction may be connected to the second common signal line COML2.

The structural characteristic of the common electrode 270 and the characteristics of the first common signal VCOM1 and the second common signal VCOM2 are similar to the exemplary embodiments described above.

Figure 13:
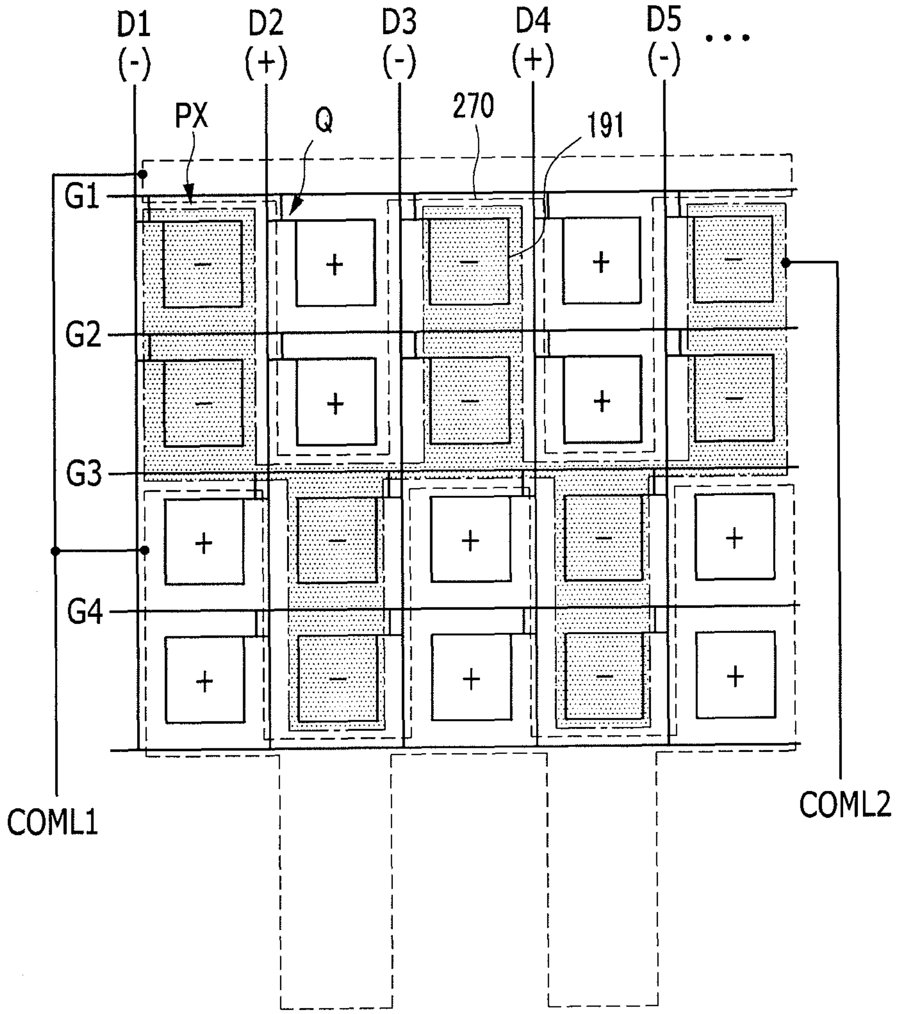

Next, the FIG. 13 embodiment is almost the same as the FIG. 11 embodiment, but a p×1 dot inversion driving form from the first pixel row may be implemented.

Figure 14:
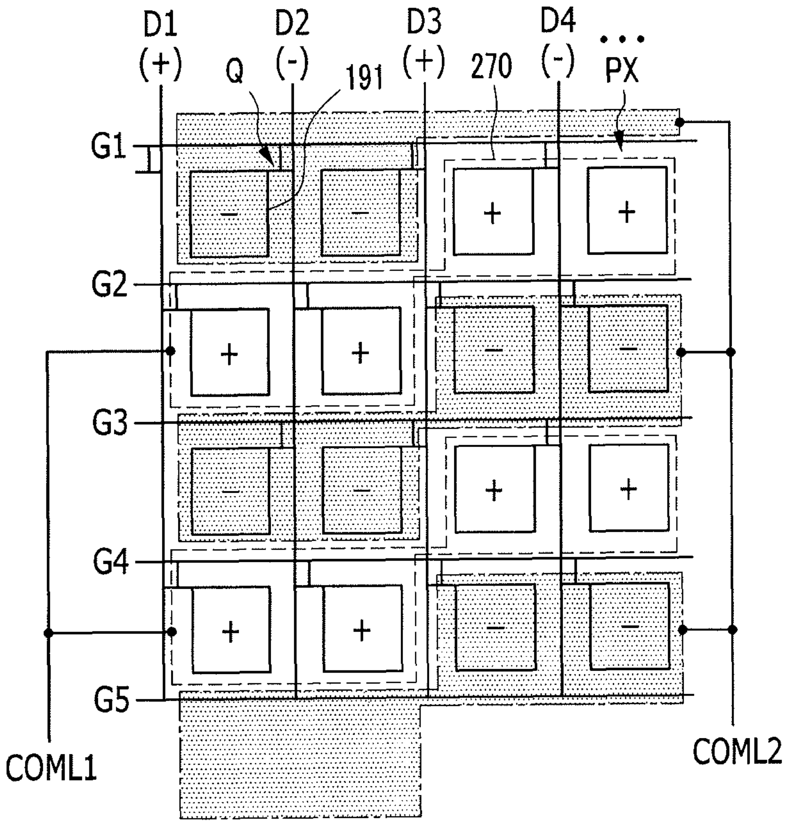

Similarly, the FIG. 14 embodiment is similar to the FIG. 12 embodiment, but a 1×p dot inversion driving form from the first pixel column may be implemented.

Hereinafter, an exemplary liquid crystal display and an exemplary driving method thereof will be described in further detail with reference to FIGS. 15 and 16.

Figure 15:
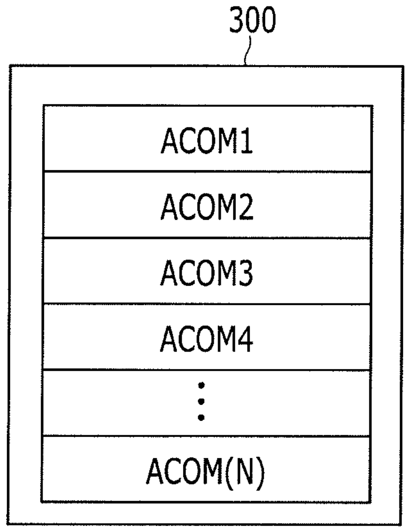
FIG. 15 is a layout view of a liquid crystal display that can be used with an exemplary embodiment.

FIG. 15 is an exemplary layout view of a liquid crystal display. FIG. 16 is an exemplary waveform diagram of a common voltage for each area of a display panel of the liquid crystal display.

The liquid crystal display illustrated in FIG. 15 is similar to the liquid crystal display according to the exemplary embodiments described above, but the liquid crystal panel assembly 300 may be divided into a plurality of blocks ACOM1, ACOM2, . . . ACOM(N) (N is a natural number of 2 or more) arranged in a column direction. In this case, the plurality of gate lines is arranged in a column direction, and scanning of gate signals Vg is performed in a column direction. Each of the blocks ACOM1, ACOM2, . . . ACOM(N) includes at least on pixel row, and common electrodes 270 included in each of the blocks ACOM1, ACOM2, . . . ACOM(N) are connected to each other. Further, the common electrodes 270 included in different blocks ACOM1, ACOM2, . . . ACOM(N) are separated from each other to independently receive the first common signal VCOM1 or the second common signal VCOM2. This will be described in further detail with reference to FIG. 16.

Figure 16:
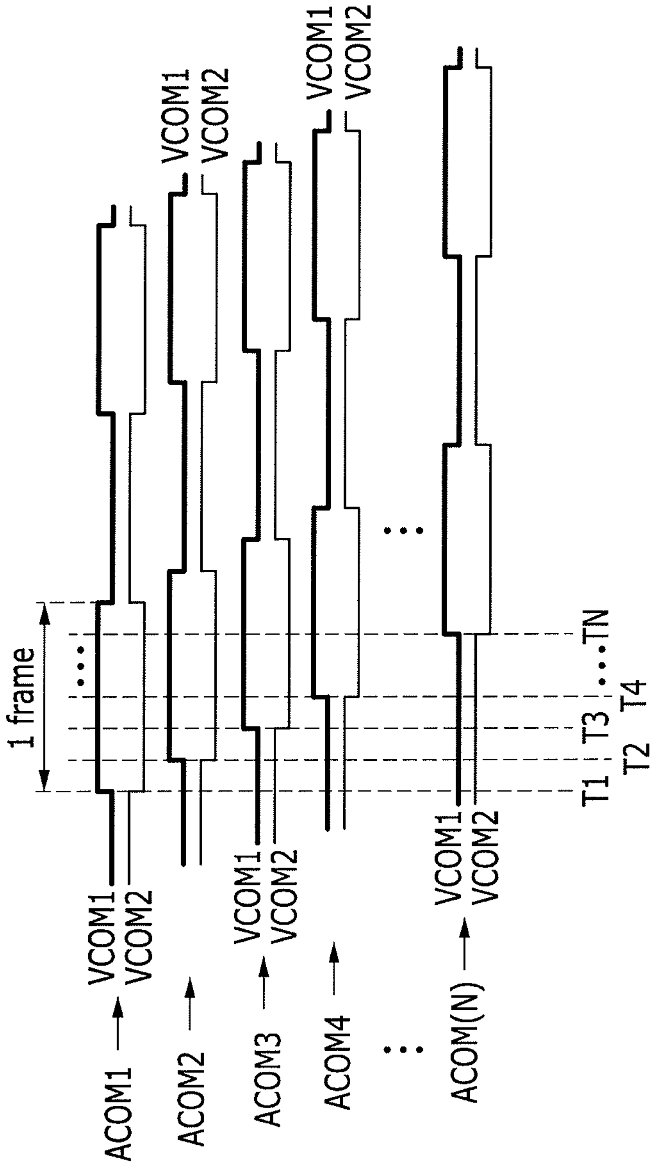
FIG. 16 is a waveform diagram of a common voltage for each area of a display panel of the liquid crystal display that can be used with an exemplary embodiment.

Referring to FIG. 16, the common electrodes 270 included in each of the blocks ACOM1, ACOM2, . . . ACOM(N) may independently receive the first common signal VCOM1 or the second common signal VCOM2. In FIG. 16, the first common signal VCOM1 and the second common signal VCOM2 are separated from each other with respect to each of the blocks ACOM1, ACOM2, . . . ACOM(N) for convenience, but swing ranges of the first common signal VCOM1 and the second common signal VCOM2 may be the same as each other.

The first common signal VCOM1 or the second common signal VCOM2 is sequentially input at a predetermined interval from the first block ACOM1 to the last block ACOM(N).

For example, when a level of the first common signal VCOM1 or the second common signal VCOM2 applied to the common electrode 270 of the first block ACOM1 is changed at a first time T1 which is the beginning of one frame, a level of the first common signal VCOM1 or the second common signal VCOM2 applied to the common electrode 270 of the second block ACOM2 is changed at a second time T2 after a predetermined time elapses from the first time T1, a level of the first common signal VCOM1 or the second common signal VCOM2 applied to the common electrode 270 of the third block ACOM3 is changed at a third time T3 after a predetermined time elapses from the second time T2, and a level of the first common signal VCOM1 or the second common signal VCOM2 applied to the common electrode 270 of the fourth block ACOM4 is changed at a fourth time T4 after a predetermined time elapses from the third time T3. As such, the process progresses, and then a level of the first common signal VCOM1 or the second common signal VCOM2 applied to the common electrode 270 of the last block ACOM(N) is changed at an N-th time TN after a predetermined time elapses from an N−1-th time T(N−1).

In each of the blocks ACOM1, ACOM2, . . . ACOM(N), a time when the first common signal VCOM1 or the second common signal VCOM2 swings and then a level is changed may synchronize with a time when a gate-on voltage Von is applied to the first gate line in the corresponding block ACOM1, ACOM2, . . . ACOM(N).

Generally, at the time when the first common signal VCOM1 or the second common signal VCOM2 applied to the common electrode 270 swings, a voltage level of the pixel electrode 191 which form a capacitor together with the common electrode 270 is increased together, but a variation of the voltage level of the pixel electrode 191 may be different from a variation of a voltage level of the first common signal VCOM1 or the second common signal VCOM2 due to parasitic capacitance with various terminals of a thin film transistor. Accordingly, at the time when the first common signal VCOM1 or the second common signal VCOM2 swings, a charging voltage, that is, a pixel voltage of a liquid crystal capacitor Clc may be slightly changed. This is called a luminance change when a common signal swings.

If all the common electrodes 270 of the liquid crystal panel assembly 300 swing at the same time, since a time when the gate-on voltage Von is applied to a gate line positioned above the liquid crystal panel assembly 300 is different from a time when the gate-on voltage Von is applied to a gate line positioned below the liquid crystal panel assembly 300, a time until a pixel PX connected to the gate line positioned above the liquid crystal panel assembly 300 is charged at a data voltage Vd then a luminance change when a common signal swings occurs may be different from a time until a pixel PX connected to the gate line positioned below the liquid crystal panel assembly 300 is charged at a data voltage Vd. This can also be different from a luminance change when a common signal swings occurs. In this case, a luminance difference between the upper and lower sides of the liquid crystal panel assemble 300 may be visually recognized.

However, as illustrated in FIGS. 15 and 16, a difference in time until a pixel PX that can be charged at a data voltage Vd and a luminance change when a common signal swings occurs for each block ACOM1, ACOM2, . . . ACOM(N) may be decreased. As the number of blocks ACOM1, ACOM2, . . . ACOM(N), that is, N is increased, a deviation in time until the pixel charged at the data voltage Vd and then a luminance change when a common signal swings occurs between the upper and lower sides of the liquid crystal panel assembly 300 may be decreased.

An exemplary liquid crystal display will be further described with reference to FIGS. 17 to 22 in addition to FIGS. 15 and 16.

FIGS. 17 to 22 are exemplary layout views of a liquid crystal display.

Figure 17:
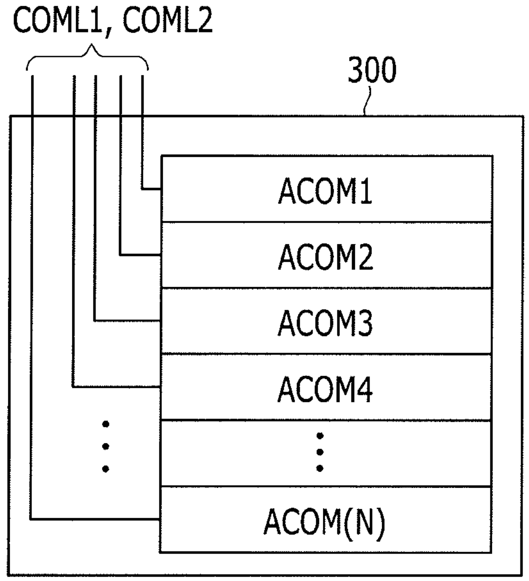
FIGS. 17 to 22 are layout views of a liquid crystal display that can be used with exemplary embodiments.
Figure 18:
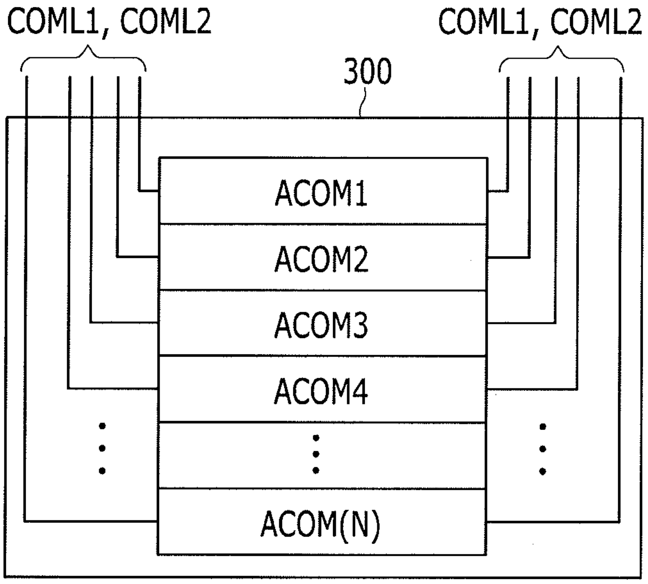
Figure 19:
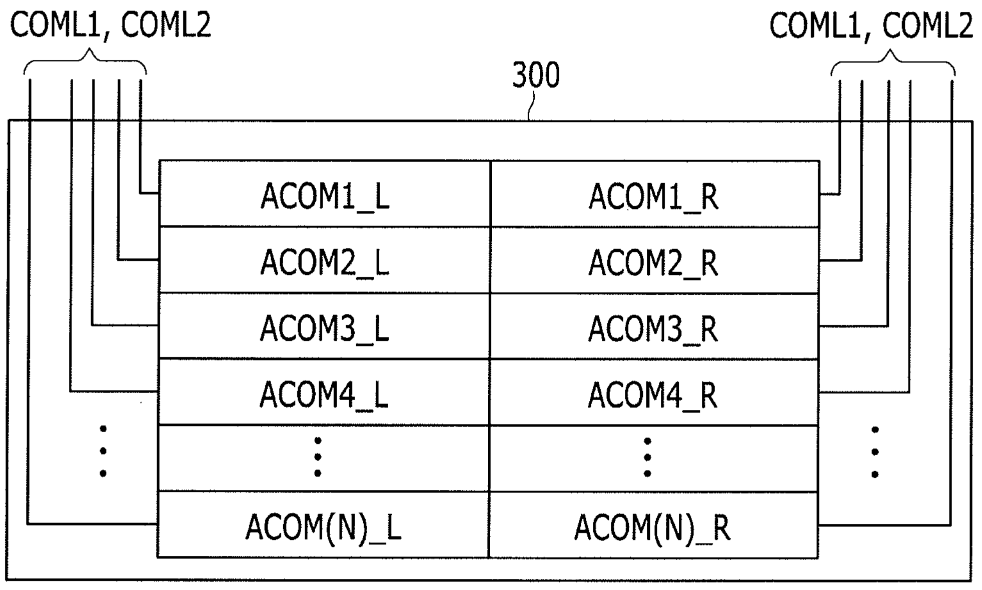

First, referring to FIGS. 17 to 19, the first common signal line COML1 and the second common signal line COML2 connected with each of the blocks ACOM 1, ACOM2, . . . ACOM(N) of the liquid crystal panel assembly 300 of the liquid crystal display may be connected with a common signal applying unit (not illustrated) positioned at a separate driving board such as a printed circuit board.

In this case, as illustrated in FIG. 17, the first common signal line COML1 and the second common signal line COML2 connected with the common electrodes 270 of all the blocks ACOM1, ACOM2, . . . ACOM(N) may be formed at one edge of the liquid crystal panel assembly 300, or may be formed at both edges of the liquid crystal panel assembly 300 as illustrated in FIG. 18.

In the case of the exemplary embodiment illustrated in FIG. 18, each of the blocks ACOM1, ACOM2, . . . ACOM(N) may be connected with the first common signal line COML1 and the second common signal line COML2 formed at both edges of the liquid crystal panel assembly 300, at both edges of the liquid crystal panel assembly 300, respectively.

In the case of the exemplary embodiment illustrated in FIG. 19, each of the blocks ACOM1, ACOM2, . . . ACOM(N) may be divided into two sub blocks ACOM1_L, ACOM1_R, . . . , ACOM(N)_L, ACOM(N)_R which are adjacent to each other in a row direction and separated from each other. Left sub blocks ACOM1_L, . . . , ACOM(N)_L and right sub blocks ACOM1_R, . . . , ACOM(N)_R of each of the blocks ACOM1, ACOM2, . . . ACOM(N) may be connected with the first common signal line COML1 and the second common signal line COML2, respectively. In this case, the first common signal line COML1 and the second common signal line COML2 connected to the left sub blocks ACOM1_L, . . . , ACOM(N)_L and the right sub blocks ACOM1_R, . . . , ACOM(N)_R of the same block ACOM1, ACOM2, . . . ACOM(N) may transfer the same signal.

Figure 20:
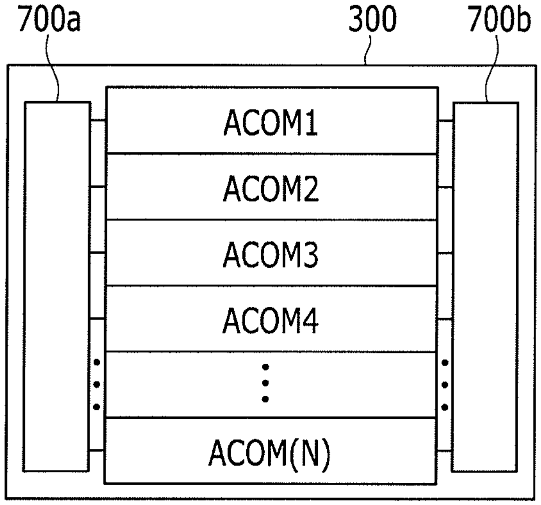
Figure 21:
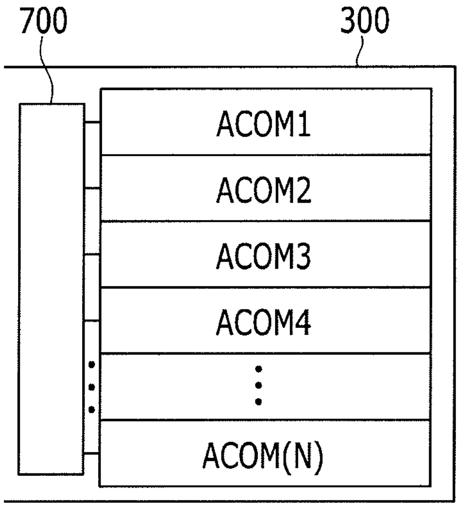
Figure 22:
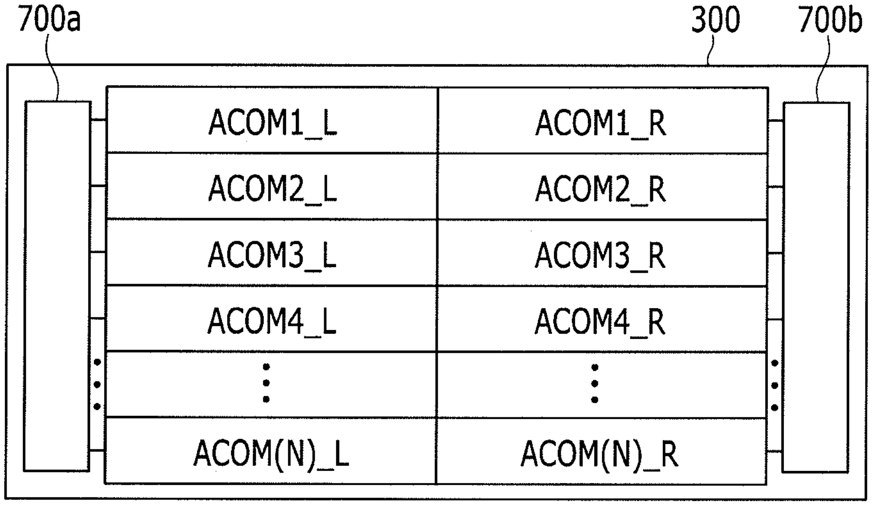

Next, referring to FIGS. 20 to 22, common signal applying units 700, 700*a*, and 700*b*, which apply a first common signal VCOM1 and a second common signal VCOM2 to the first common signal line COML1 and the second common signal line COML2 connected with each of the blocks ACOM1, ACOM2, . . . ACOM(N) of the liquid crystal panel assembly 300 of the liquid crystal display according to the exemplary embodiment of the described technology, may be installed or integrated on a substrate of the liquid crystal panel assembly 300.

In this case, as illustrated in FIG. 20, the two common signal applying units 700*a* and 700*b* may be formed at both edges of the liquid crystal panel assembly 300, respectively, or one common signal applying unit 700 may be formed at one edge of the liquid crystal panel assembly 300 as illustrated in FIG. 21.

Referring to FIG. 22, each of the blocks ACOM1, ACOM2, . . . ACOM(N) may be divided into two sub blocks ACOM1_L, ACOM1_R, . . . , ACOM(N)_L, ACOM(N)_R which are adjacent to each other in a row direction. Left sub blocks ACOM1_L, . . . , ACOM(N)_L and right sub blocks ACOM1_R, ACOM(N)_R of each of the blocks ACOM1, ACOM2, . . . ACOM(N) may be connected with the first common signal line COML1 and the second common signal line COML2, respectively. In this case, the first common signal line COML1 and the second common signal line COML2 connected to the left sub blocks ACOM1_L, . . . , ACOM(N)_L and the right sub blocks ACOM1_R, . . . , ACOM(N)_R of the same block ACOM1, ACOM2, . . . ACOM(N) may transfer the same signal. Further, the left sub blocks ACOM1_L, . . . , ACOM(N)_L may receive the first common signal VCOM1 and the second common signal VCOM2 from the common signal applying unit 700*a* positioned at the left of the liquid crystal panel assembly 300, and the right sub blocks ACOM1_R, . . . , ACOM(N)_R may receive the first common signal VCOM1 and the second common signal VCOM2 from the common signal applying unit 700*b* positioned at the right of the liquid crystal panel assembly 300.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:

a plurality of pixels arranged in a matrix form, the pixels respectively including a liquid crystal capacitor, wherein the liquid crystal capacitor comprises a pixel electrode and a common electrode as two terminals; and a plurality of data lines configured to transfer data voltages to the pixels, wherein the pixels include first and second pixels which are adjacent to each other in a row or column direction, wherein the common electrode of the first pixel is configured to receive a first common signal, wherein the common electrode of the second pixel is configured to receive a second common signal which is inverted to the first common signal, wherein the first and second common signals are configured to swing between first and second voltages which are different from each other for at least every one frame, wherein the polarity of the data voltage transferred by a data line with respect to the first or second common signal is constant during one frame, and wherein the pixels comprise a plurality of switching elements respectively configured to receive the data voltages, and wherein the switching elements positioned in one column are alternately connected to two of the data lines for every predetermined number of rows.

2. The liquid crystal display of claim 1, wherein the polarity of the data voltage applied to the first pixel with respect to the first common signal is opposite to the polarity of the data voltage applied to the second pixel with respect to the second common signal.

3. The liquid crystal display of claim 2, wherein the polarities of the data voltages applied to a predetermined number of pixels which are adjacent to each other in a row or column direction with respect to the first or second common signal are the same as each other.

4. The liquid crystal display of claim 2, further comprising:

a plurality of gate lines configured to transfer gate signals to the pixels, the gate lines being arranged in a column direction, and a plurality of blocks arranged in a column direction, each of the blocks including at least one pixel row, wherein swing times of the first or second common signal applied to the pixel included in different ones of the blocks are different from each other.

5. The liquid crystal display of claim 4, wherein the swing times of the first or second common signal applied to the blocks are sequentially positioned in one frame.

6. The liquid crystal display of claim 5, further comprising:

a first common signal line configured to transfer the first common signal;

a second common signal line configured to transfer the second common signal; and a common signal applying unit electrically connected to the first and second common signal lines.

7. The liquid crystal display of claim 6, wherein each of the blocks includes two sub blocks which are adjacent to each other in a row direction and separated from each other.

8. A liquid crystal display, comprising:

a plurality of pixels arranged in a matrix form, wherein each of the pixels comprises a liquid crystal capacitor, and wherein the liquid crystal capacitor includes a pixel electrode and a common electrode as two terminals; and a plurality of data lines configured to transfer data voltages to the pixels; and a plurality of gate lines configured to transfer gate signals to the pixels and arranged in a column direction, wherein the pixels include i) a first pixel and ii) a second pixel which are adjacent to each other in a row or column direction, wherein the common electrode of the first pixel is configured to receive a first common signal, wherein the common electrode of the second pixel is configured to receive a second common signal which is inverted to the first common signal, wherein the first and second common signals are configured to swing between first and second voltages which are different from each other for at least every one frame, wherein a plurality of blocks are arranged in a column direction, each of the blocks including at least one pixel row, and wherein swing times of the first or second common signal applied to the pixel included in different ones of the blocks are different from each other, and wherein the pixels comprise a plurality of switching elements respectively configured to receive the data voltages, and wherein the switching elements positioned in one column are alternately connected to two of the data lines for every predetermined number of rows.

9. The liquid crystal display of claim 8, wherein the swing times are sequentially positioned in one frame.

10. The liquid crystal display of claim 9, further comprising:

a first common signal line configured to transfer the first common signal;

a second common signal line configured to transfer the second common signal; and a common signal applying unit electrically connected to the first and second common signal lines.

11. The liquid crystal display of claim 10, wherein each of the blocks includes two sub blocks which are adjacent to each other in a row direction and separated from each other.

12. The liquid crystal display of claim 8, wherein the polarity of the data voltage transferred by a data line with respect to the first or second common signal is constant during one frame.

13. The liquid crystal display of claim 12, wherein the polarity of the data voltage applied to the first pixel with respect to the first common signal is opposite to the polarity of the data voltage applied to the second pixel with respect to the second common signal.

14. The liquid crystal display of claim 13, wherein the polarities of the data voltages applied to a predetermined number of pixels which are adjacent to each other in a row or column direction with respect to the first or second common signal are the same as each other.

15. A driving method of a liquid crystal display comprising i) a plurality of pixels arranged in a matrix form, the pixels respectively including a liquid crystal capacitor, wherein the liquid crystal capacitor includes a pixel electrode and a common electrode as two terminals, and ii) a plurality of data lines connected to the pixels, wherein the pixels include first and second pixels adjacent to each other in a row or column direction, the method comprising:

applying a first common signal to the common electrode of the first pixel, applying a second common signal which is inverted to the first common signal to the common electrode of the second pixel; and applying to a data line a data voltage of which the polarity with respect to the first or second common signal is constant during one frame, wherein the first and second common signals swing between first and second voltages which are different from each other for at least every one frame, and wherein the pixels comprise a plurality of switching elements respectively configured to receive the data voltage, and wherein the switching elements positioned in one column are alternately connected to two of the data lines for every predetermined number of rows.

16. The driving method of a liquid crystal display of claim 15, wherein the polarity of the data voltage applied to the first pixel with respect to the first common signal is opposite to the polarity of the data voltage applied to the second pixel with respect to the second common signal.

17. A driving method of a liquid crystal display including i) a plurality of pixels arranged in a matrix form, the pixels respectively comprising a liquid crystal capacitor, wherein the liquid crystal capacitor includes a pixel electrode and a common electrode as two terminals, and wherein the pixels include first and second pixels adjacent to each other in a row or column direction and ii) a plurality of data lines connected to the pixels, the method comprising:

applying a first common signal to the common electrode of the first pixel;

applying a second common signal which is inverted to the first common signal to the common electrode of the second pixel; and applying data voltages to the data lines, wherein the first and second common signals swing between first and second voltages which are different from each other for at least every one frame, and wherein swing times of the first or second common signal, applied to the pixel included in different ones of the blocks arranged in a column direction each including at least one pixel row, are different from each other, and wherein the pixels comprise a plurality of switching elements respectively configured to receive the data voltages, and wherein the switching elements positioned in one column are alternately connected to two of the data lines for every predetermined number of rows.

18. The driving method of a liquid crystal display of claim 17, wherein the swing times are sequentially positioned in one frame.

* * * * *